Dec. 9, 1947.  D. E. PEARSON  2,432,249
BUMPER BRACKET OR SUPPORT
Filed June 24, 1946  2 Sheets-Sheet 1
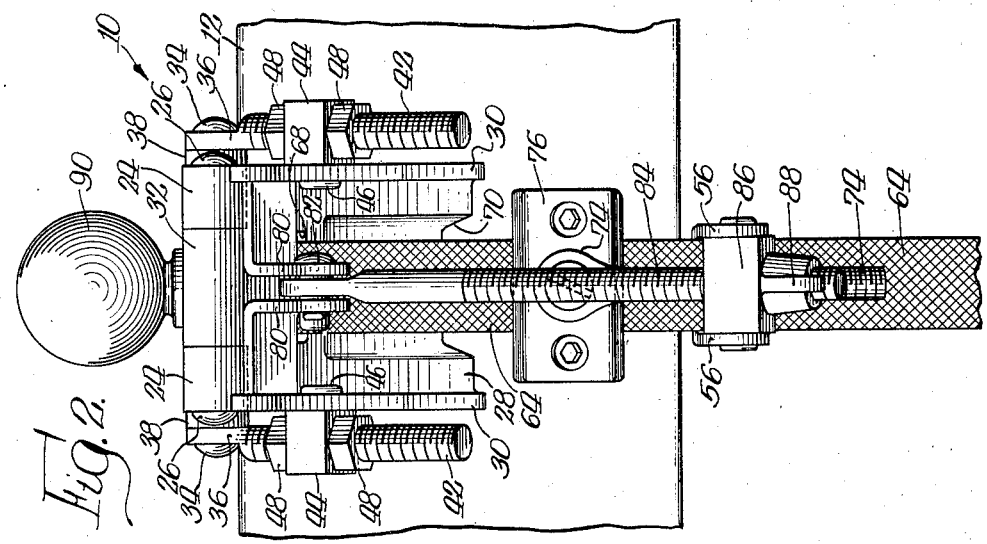
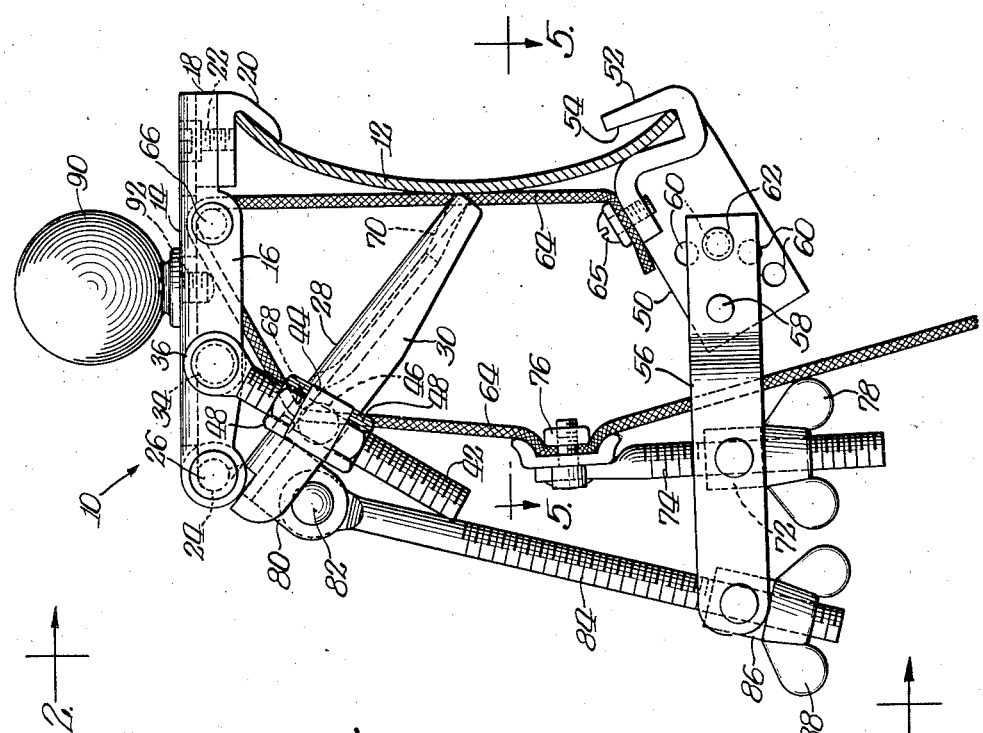
INVENTOR.
David E. Pearson,
BY Ira J. Wilson
Atty.

Dec. 9, 1947.  D. E. PEARSON  2,432,249
BUMPER BRACKET OR SUPPORT
Filed June 24, 1946  2 Sheets-Sheet 2
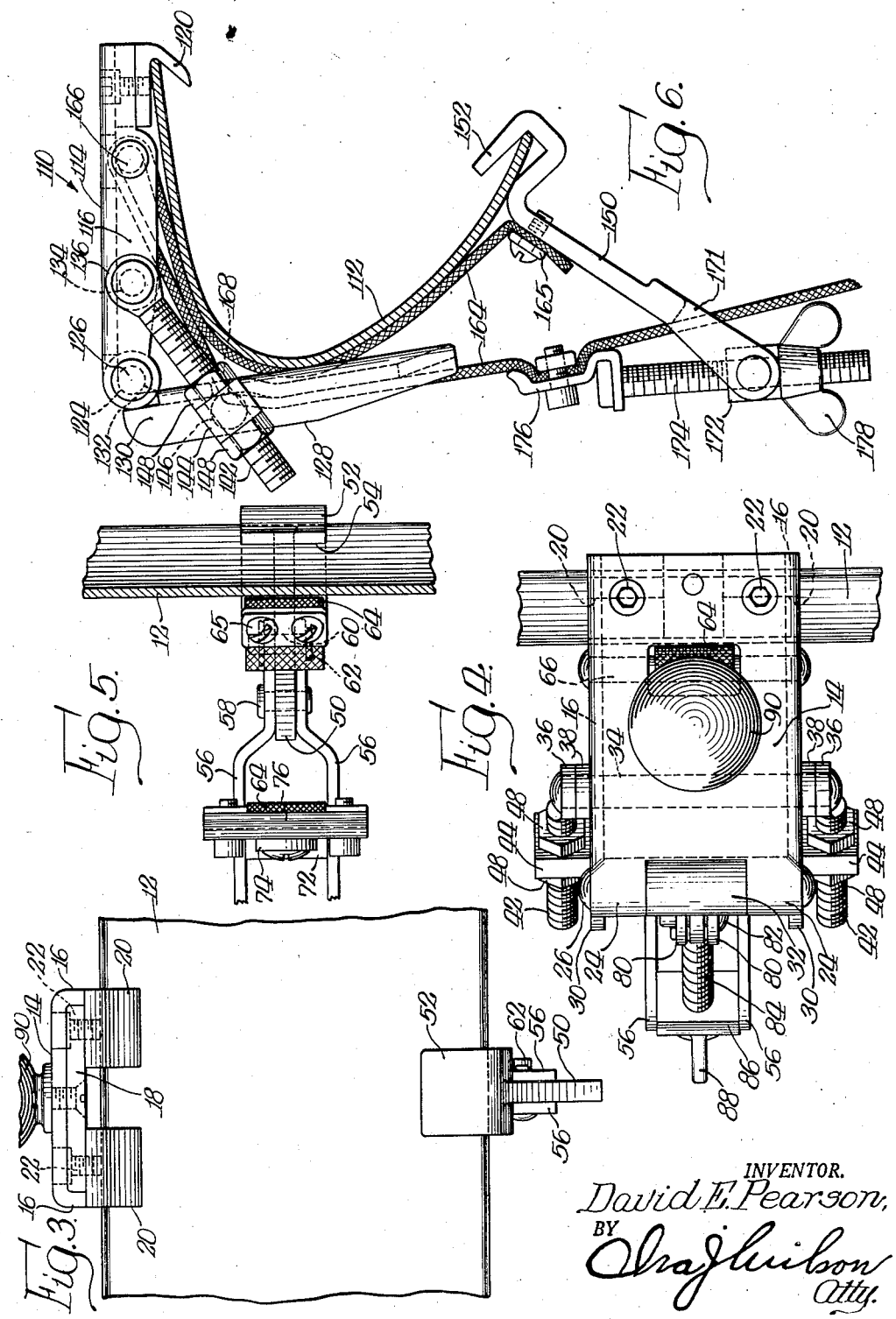
INVENTOR.
David E. Pearson,
BY
Ira J. Wilson
Atty.

Patented Dec. 9, 1947

2,432,249

UNITED STATES PATENT OFFICE 2,432,249

BUMPER BRACKET OR SUPPORT

David E. Pearson, Chicago, Ill.

Application June 24, 1946, Serial No. 678,904

7 Claims. (Cl. 224—29)

This invention relates generally to devices which may be clamped to objects of irregular configuration to furnish a support, and has particular reference to a clamp which may be secured to a vehicle bumper of irregular configuration or cross-section and which will form a support for luggage, trailer hitches, fishing equipment or the like.

One of the principal objects of the invention is to provide a support for luggage, fishing equipment such as minnow buckets or the like, trailer hitches, which support may readily be attached to vehicle bumpers of varying shapes and configurations.

A further object is to provide a support adapted to be secured to an object of irregular configuration, the support being of a universal type adapted to be interchangeable with objects of different configurations.

Still another object is to provide a support which may be employed or used in pairs, and adapted to hold thereto a platform or the like upon which may be supported a variety of luggage, sport equipment, or the like.

Other objects of the invention will be apparent from a study of the description hereinafter taken with the drawings which show preferred embodiments of the invention. It is understood, however, that the invention may take other forms, and that the scope of the invention is determined only by the claims subjoined.

In the drawings:

Figure 1 is a side elevation of a support according to the present invention, shown secured to a vehicle bumper, and showing a ball for a trailer hitch secured to the support;

Figure 2 is a front elevation looking in the direction of the arrows 2—2 of Figure 1;

Figure 3 is a rear elevation of Figure 1;

Figure 4 is a top view of Figure 1;

Figure 5 is a view looking in the direction of the arrows 5—5 of Figure 1;

Figure 6 is a side elevation of another embodiment of the invention, showing the invention as applied to a vehicle bumper of different contour.

Referring to Figures 1 to 5, the support according to the present invention is indicated generally by the ordinal 10 and is shown as applied to a vehicle bumper 12. The support 10 comprises a horizontally extending member 14 in the form of a channel having side rails 16. The member 14 is adapted to be hooked to the bumper 12, and has secured at one end thereof a plate 18 to which a pair of hooks 20 are secured by means of countersunk machine screws 22.

The other end of the member 14 and the rails 16 are provided with eyes 24 which hold a pin 26. A brace member 28 in the form of a channel having side rails 30 has formed thereon an eye 32 which embraces the pin 26, thereby providing a hinged connection between the member 14 and the member 28.

The member 28 normally bears against the bumper 12 when the member 14 is in horizontal position as shown in Figure 1, and to this end means are provided for maintaining the position of the member 28 with respect to the member 14, and as shown, the rails 16 have passing therethrough a pin 34, which supports at each end an eye-bolt 36, each of which carries a spacing washer 38, and is riveted or headed over at its ends at 40. The threaded shank 42 of the eye-bolt 36 passes through blocks 44 pin connected, as at 46, to the side rails 30 of the member 28. Nuts 48 are provided on each side of the block 44 for locking the member 28 into position with respect to the horizontal member 14. It will be seen from the foregoing description that the member 14 may be hooked in a horizontal position at 20 to the upper edge of the bumper 12, that the brace member 28 may be pivoted into bearing engagement with the face of the bumper 12, and that the two members 14 and 28 may be locked into position relative to each other and the bumper 12.

Means are provided for causing the members 14 and 28 to be maintained firmly in engagement with the bumper 12, and to this end the lower edge of the bumper 12 has in hooking engagement therewith a member 50 provided with a hook 52 of substantially U-shaped cross-section forming a slot 54. The hook 52 thereby readily straddles the lower edge of the bumper 12 and readily accommodates bumpers of different configurations. The member 50 has adjustably connected thereto, by means of a pin 58, a member 56 which may be formed of two halves as shown. Adjustment of the angular position of the member 56 with respect to the member 50 is had by a series of radial holes 60 which co-operate with a pin 62 passing through a hole in member 56 and through one of the holes 60 in member 50.

A loop of flexible material 64, such as canvas webbing, is secured to the hook 52 at 65 and passes over a pin 66 spanning the side rails 16 of the member 14 and secured thereto in any convenient manner. The flexible material 64 also passes through a transverse opening or slot 68 in the web of the member 28. It will be apparent that the web of member 28 is also relieved at 70 to provide clearance for the flexible material 64.

Means are provided for placing tension on the webbing 64 which will tend to rock the member 14 downward and the member 28 into firm engagement with the bumper 12, and as seen particularly in Figure 1, the member 56 supports a block 72 having a hole therein through which a threaded member 74 passes. The threaded member 74 supports at one end thereof a clamp 76 which grips the webbing 64. The other end of the threaded member 74 is engaged by a wing nut 78. It will be apparent that by drawing up the wing nut 78 that tension will be placed on the webbing 64 and that the hook 52 will tend to be rocked to engage the bumper 12 firmly, and at the same time, as has been explained, the member 14 will tend to be rocked placing a thrust or bearing on the member 28, thereby holding the entire assembly into firm engagement with the bumper 12.

In order to insure that the entire assembly will be held together in the manner as above described irrespective of the condition of the webbing 64 or the tension thereon an adjustable link is provided between the members 14 and 28 and the member 56. Accordingly, the side rails 30 of member 28 have welded thereto lugs 80 which have connected thereto, by means of a pin 82, a threaded link 84. The link 84 passes through a block 86 pivotally held by the member 56 and the other end of the link 84 has threaded thereto a wing nut 88. It will be seen that when the wing nut 88 is drawn up that member 14 tends to be rocked downward, causing member 28 to bear more firmly against the face of bumper 12, and that the member 56 will tend to be rocked upwardly to cause the hook 52 more firmly to engage the lower edge of the bumper 12. Obviously, should the webbing 64 fail for any reason, the link 84 will take over all the functions of the webbing 64.

The support 10 is shown with a ball 90 for a trailer hitch secured thereto by threading into a tapped hole 92. Obviously, a pair of supports can be spaced along the length of the bumper 12 and any platform can be conveniently secured at the tapped hole 92 whereby luggage of many kinds may be carried.

Referring now to Figure 6, there is shown the invention as applied to a bumper of different configuration. In the embodiment shown here, use is not made of the extra link for holding the members in firm engagement with the bumper. The support according to the embodiment of the invention in Figure 6 is indicated generally by the ordinal 110, and is shown as applied to a vehicle bumper 112. The support 110 comprises a horizontally extending member 114 in the form of a channel having side rails 116 and adapted to be hooked to the upper edge of the bumper 112 by means of a hook 120 secured to the member 114 by countersunk machine screws or the hook may be secured to member 114 in any other convenient manner.

The other end of the member 114 and the rails 116 are formed into eyes 124 which hold a pin 126. A member 128 in the form of a channel has side rails 130 and has formed thereon an eye 132 which embraces the pin 126, thereby providing a hinged connection between the member 114 and the member 128.

The member 128 normally bears against the bumper 112 when the member 114 is in horizontal position, and to maintain this relative position the rails 116 support a pin 134, which supports at each end an eye-bolt 136, each of which is secured in position by screws 140 tapped into the pin 134. The threaded shank 142 of the eye-bolt 136 passes through blocks 144 pin connected, as at 146, to the side rails 130 of the member 128. Nuts 148 are provided on each side of the block 144 for locking the member 128 into position with respect to the horizontal member 114. It will be apparent from the above description, that the member 114 may be hooked in a horizontal position at 120 to the upper edge of the bumper 112, that the member 128 may be pivoted into bearing engagement with the face of the bumper 112, and that the two members 114 and 128 may be locked into fixed position relative to each other and the bumper 112.

Means are provided for causing the members 114 and 128 to be maintained firmly in engagement with the bumper 112, and to this end the lower edge of the bumper 112 has in hooking engagement therewith a member 150 having thereon a substantially U-shaped hook 152.

A loop of flexible material 164, such as canvas webbing, is secured to the member 150 at 165 and passes over a pin 166 spanning the side rails 116 and secured thereto in any convenient manner. The webbing 164 also passes through a transverse slot or opening 168 in the web of the member 128.

Means are provided for placing tension on the webbing 164 which will tend to rock the member 114 downward and the member 128 into firm engagement with the bumper 112, and as seen in Figure 6, the member 150 is bifurcated at 171 to support pivotally a block 172 having an opening therein through which a threaded member 174 passes. The threaded member 174 supports at one end thereof a clamp 176 which grips the webbing 164. The other end of the threaded member 174 is engaged by a wing nut 178. It will be apparent that by drawing up the wing nut 178 that tension will be placed on the webbing 164 and that the hook 152 will tend to be rocked to engage the bumper 112 firmly and at the same time the member 114 will tend to be rocked forcing the member 128 into firm engagement with the bumper 112 at the side rails 130, thereby holding the entire assembly into firm engagement with the bumper 112.

As was the case with the embodiment shown in Figures 1 to 5 inclusive, the support according to Figure 6 may support a ball for a trailer hitch, or a pair of supports may be positioned along the bumper 112 to which a platform may conveniently be secured to hold luggage or gear of any description.

While the invention has been described by way of two examples or embodiments, its scope is not intended to be limited to the embodiments shown only, but by way of the claims here appended only.

I claim:

1. Supporting means of the class described adapted to be secured to a vehicle bumper comprising a substantially horizontally extending member in hooking engagement with an edge of said bumper, a member secured to said first member and bearing against the face of said bumper, means for locking the said first member in position relative to said second member, a third member hooked to the other edge of said bumper, flexible material secured to said third member and in engagement with said first and second members, a member adjustable in position with respect to said third member, and means supported by said last named member and connected to said flexible material for maintaining the members in hooking and bearing engagement with said bumper in firm engagement with said bumper.

2. Supporting means of the class described adapted to be secured to a vehicle bumper comprising a substantially horizontally extending member in hooking engagement with an edge of said bumper, a member secured to said first member and bearing against the face of said bumper, means for locking the said first member in position relative to said second member, a third member hooked to the other edge of said bumper, flexible material secured to said third member and in engagement with said first and second members, a member adjustable in position with respect to said third member, means supported by said last named member and connected to said flexible material for maintaining the members in hooking and bearing engagement with said bumper in firm engagement with said bumper, and an adjustable link connecting said adjustable member to said second member.

3. A supporting bracket structure adapted to be mounted on an automobile bumper, comprising an upper member provided at its inner end with a hook shaped to engage the upper edge of said bumper, a lower member provided at its inner end with a hook shaped to engage the lower edge of said bumper, said members, except for said hooks, being disposed entirely outwardly beyond the bumper to which they are attached, means for drawing said hooks together to effect a clamping engagement with said bumper, a brace bar pivotally connected to said upper member near the outer end thereof, and adjustable means for positioning said brace bar so as to engage the outer face of said bumper whereby said structure is maintained in outwardly projecting position on said bumper.

4. A supporting bracket structure adapted to be detachably mounted upon an automobile bumper, comprising upper and lower members equipped with hooks for engaging the upper and lower edges, respectively, of the bumper, means connecting said members so as to prevent disengagement of said hooks from the bumper, a brace member adjustably connected to said upper member, and means for adjusting the position of said brace member into contacting relation with the outer face of said bumper to thereby support the outer end of said upper member in predetermined position, irrespective of the contour of said bumper.

5. A supporting bracket structure adapted to be detachably mounted on an automobile bumper, comprising upper and lower members provided at their inner ends with hooks for engagement with the upper and lower edges, respectively, of said bumper, means for preventing separation of the inner ends of said members thereby preventing disengagement of said hooks from the bumper, a brace member pivoted to the outer end of the upper member and adapted to engage the outer face of the bumper, and an adjustable connection between said upper member and said brace member intermediate the ends thereof whereby the position of the brace member may be adjusted to maintain the outer end of the upper member at a predetermined elevation.

6. A supporting bracket for detachable connection to an automobile bumper, comprising hooked members constructed to engage with the upper and lower edges, respectively, of a bumper, a brace member connected to one of said members and adapted to engage the outer face of the bumper, means for adjusting the position of said brace member to thereby regulate the elevation of the outer end of said one member, and means connecting said hooked members so as to prevent disengagement of said members from the bumper.

7. A supporting bracket for attachment to an automobile bumper, comprising upper and lower members equipped with hooks for engagement with the upper and lower edges of the bumper, a brace member connected with the upper member and adapted to engage the outer face of the bumper, means for adjusting the position of said brace member to thereby adjust the height of the outer end of the upper member, and releasable means for drawing said hooked members together into clamping relation with the bumper, said structure being detachable from the bumper upon release of said means.

DAVID E. PEARSON.

REFERENCES CITED

The following references are of record in the file of this patent:

UNITED STATES PATENTS

| Number | Name | Date |
|---|---|---|
| 1,528,268 | Schlegel | Mar. 3, 1925 |
| 1,657,190 | Ballou | Jan. 24, 1928 |
| 1,886,911 | Schulman | Nov. 8, 1932 |
| 2,142,365 | McKee | Jan. 3, 1939 |
| 2,204,824 | Rock | June 18, 1940 |
| 2,254,790 | Benton | Sept. 2, 1941 |
| 2,379,994 | Schwinn | July 10, 1945 |